United States Patent [19]

Seilly

[11] 4,090,097

[45] May 16, 1978

[54] ELECTROMAGNETIC DEVICES

[75] Inventor: Alec Harry Seilly, North Wembley, England

[73] Assignee: Simms Group Research & Development Limited, Birmingham, England

[21] Appl. No.: 751,722

[22] Filed: Dec. 17, 1976

[30] Foreign Application Priority Data

Jan. 22, 1976 United Kingdom ................. 2518/76

[51] Int. Cl.[2] ............................................. H02K 33/00

[52] U.S. Cl. ...................................... 310/27; 335/220; 335/266

[58] Field of Search .................. 335/220, 266; 310/27, 310/80, 13

[56] References Cited

U.S. PATENT DOCUMENTS 3,353,040 11/1967 Abbott .................................. 310/27

4,003,013 1/1977 Seilly .................................... 335/220

FOREIGN PATENT DOCUMENTS 795,000 5/1958 United Kingdom .................. 310/27

*Primary Examiner*—Donovan F. Duggan

*Attorney, Agent, or Firm*—Andrus, Sceales, Starke & Sawall

[57] ABSTRACT

An electromagnetic device comprises an annular member and a core member the latter having formed in its slots and the annular member having projections located in said slots. The projections and the adjacent wall of the slot define attraction faces which when a winding located in the slot is energized, are attracted towards each other thereby to produce relative movement between the members. The other faces of the projection are provided in accordance with the invention, with a coating of an electrically conductive material so that when the windings are energized eddy currents flow in the conductive material which act to assist the relative movement of the members.

6 Claims, 3 Drawing Figures

ELECTROMAGNETIC DEVICES

This invention relates to electromagnetic devices of the kind comprising a pair of relatively movable magnetizable members, one of said members defining a plurality of slots disposed in side by side relationship, the other member defining a plurality of projections entering into said respectively and of a smaller width than said slots, one side face of each slot and each projection being hereinafter referred to as the attraction faces and the other two faces being termed the trailing faces, some or all of said slots accommodating an electrical winding the connection of the winding or windings being such that any two slots in which the flow of current in the windings therein is in the same direction are separated by a slot with either no winding or with a winding in which the flow of current is in the opposite direction, the winding in the slot being secured on one of the trailing faces, whereby when said windings are energised the members will move to reduce the gap between said attraction faces.

The object of the present invention is to provide such a device in a form in which the initial rate of movement of the two members when the winding is energised, is improved.

According to the invention the other of the trailing faces is provided with a coating of a low resistance material the arrangement being such that eddy currents are generated in the coating said eddy currents creating a magnetic field acting to oppose the magnetic field produced by the current flow through said winding whereby a force is developed tending to cause separation of said trailing faces thereby assisting the movement of the members.

One example of an electromagnet device in accordance with the invention will now be described with reference to the accompanying drawings, in which.

The design requirements for the device include a low inertia of the moving parts, a high mechanical force output and high speed operation.

Figure 1:
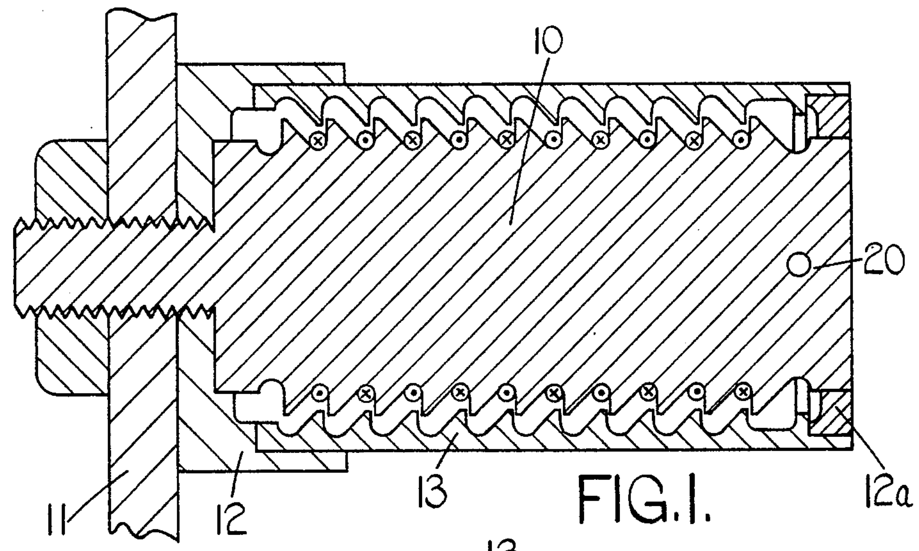
FIG. 1 is a sectional side elevation of the device.
Figure 2:
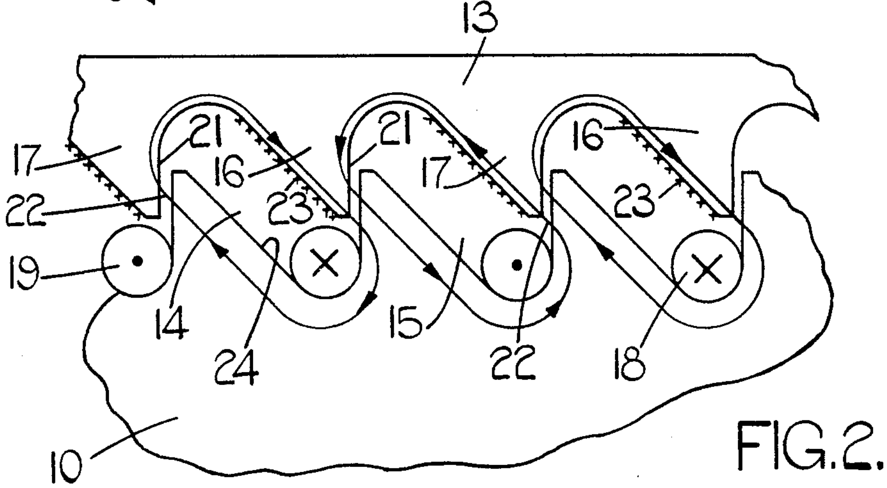
FIG. 2 is an enlarged section of a portion of the device seen in FIG. 1.

With reference to FIGS. 1 and 2 of the drawings the device comprises a central core member 10 which at one end is provided with a threaded stud whereby it can be secured to a support member 11. Disposed between the core member and the support member 11 is a cup shaped part 12 through an aperture in the base wall of which extends the stud. The cup shaped part 12 acts to locate an annular member 13 about the core member 10, whilst at the same time allowing limited axial movement between the members. At the opposite end a sleeve 12*a* locates the two members relative to each other.

The core member 10 and the annular member 13 are formed from magnetizable material. Moreover, the core member 10 is provided with slots into which enter projections formed on the annular member. In practice, and as shown, the members are provided with interengageable screw threads, the threads being formed so that appreciable relative axial movement can take place between the members. For reasons which will be explained, the threads formed on the members are two start threads although it will be understood that any multiple of two threads may be used. It will be seen that the core member 10 in the case of a two start thread, is provided with two helical slots 14, 15 FIG. 2 whilst the annular member 13 is provided with two helical projections 16, 17 FIG. 2 disposed in the slots 14, 15 respectively, in this arrangement the threads on the two members are of identical cross section. It is nevertheless convenient for the purpose of description to talk about slots and projections and the use of the term slot will be confined to the threads on the member upon which windings are wound.

Figure 3:
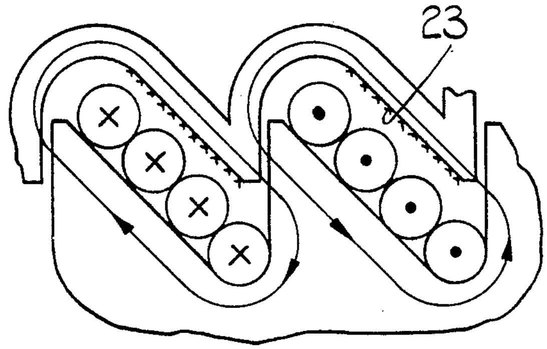
FIG. 3 is a view similar to FIG. 2.

As shown in FIGS. 1 and 2 each slot 14, 15 in the core member 10 is provided with a winding 18, 19 in this case a winding having a single turn. For the purpose of understanding, in FIG. 1 the dot and cross indication is used to represent the respective windings and in FIG. 2 whilst indicating the respective windings, the dot and cross indication also indicates the direction of electric current flow. The two windings 18, 19 are formed from a continuous length of insulated wire which is wound away from one end of the core member 10 conveniently the stud end of the core member, along one thread through a transverse aperture 20 at the other end of the core member and back along the other thread towards said one end of the core member. As seen in FIG. 3 the windings are provided with four turns.

The shape of the threads formed on the two members is important. The projections 16, 17 have radially extending side faces 21 which in the de-energised condition of the winding are disposed in spaced parallel side by side relationship to side faces 22 defined by the slots. The faces 21 and 22 have been referred to as attraction faces. The other faces 23 of the projections 16, 17 incline outwardly and the other faces 24 of the slots incline in a similar manner, these faces having been referred to as the trailing faces. The axial spacing between the faces 24, 23 is considerably larger than the spacing between the faces 21, 22.

When electric current is passed through the wire, each winding 18, 19 produces a magnetic flux which follows a path through the core member 10 across the two gaps defined between the two pairs of faces 21 and 22 and through the member 13. The two members therefore strive to move relative to each other in a direction to reduce the spacing between the attraction faces so that the reluctance of the gaps is reduced and a mechanical force is created. It will be noted that because of the different direction of the windings, 18, 19 the direction of the flux generated due to each winding is opposite. However, for any one of said gaps the direction of the flux flowing across the gap due to the two windings, is the same. The flux generated by the two windings therefore has an additive effect. The path for leakage flux for instance between the faces 23, 24 is maintained as large as possible by suitable choice of the configuration of the threads and by the pitch of the threads. It should be noted that the windings are secured on the trailing faces of one of the members in this case the faces 24 of the member 10. It will be understood that the windings could be secured on the trailing faces defined by the other member.

In order to improve the initial rate of movement of the two members a coating of electrically conductive material is provided on the trailing faces of the member which does not carry the windings. In this case the coating is provided on the faces 23 and conveniently the coating is constituted by a plated layer of copper or some other such good electrical conductor. In FIGS. 2 and 3 the coating is indicated by a series of crosses.

In operation the changing magnetic field about the conductors causes eddy currents to flow in the coating and these in turn cause magnetic field which opposes the magnetic field about the conductors. As a result a force is produced acting to separate the trailing faces this force supplementing the force acting between the attraction faces. As a result the initial rate of movement of the two members towards each other is increased thereby resulting in faster movement of the members.

In FIG. 2 the cnductors are at the bottoms of the slots in which they are located. This is not the ideal position and indeed the eddy currents which will flow in the coating will be small. In the case where there is only a single conductor it should be spaced away from the bottom of the slot about half way along the trailing face of the respective slot. Alternatively the conductor may be formed as tape rather than wire. Where a multi turn winding is employed then the winding is already distributed along the trailing face.

I claim:

1. An electromagnetic device of the kind comprising first and second relatively movable magnetizable members, an electrical winding means, the first of said members including a plurality of slots disposed in side by side relationship, the second of said members including a plurality of projections entering into said slots respectively and of a smaller width than said slots, one opposed side face of each slot and each projection defining attraction faces and the other two opposed faces defining trailing faces, said winding means wound in said slots, the connection of the winding means being such that at least two spaced slots have the flow of current in the winding means therein in the same direction and separated by at least one interposed slot in which such directional flow of current is absent, the winding means in the slots being secured on the trailing faces of the slots, whereby when said windings are energized the members will move to reduce the gap between said attraction faces, a coating of a low resistance material secured to the trailing faces of the projections such that eddy currents are generated in the coating, said eddy currents creating a magnetic field adjacent the projections acting to oppose the magnetic field produced by the current flow through said winding means whereby a force is developed tending to cause separation of said trailing faces thereby assisting the relative movement of the members to reduce said gap between said attraction faces.

2. A device according to claim 1 in which said slots are defined by at least two adjacent and intermeshed helical slots, said projections being similarly formed, said coating being applied only to said trailing faces of said projections.

3. A device according to claim 2 in which individual windings are located in each of the helical slots, the current flow in the windings in adjacent slots being in the opposite direction.

4. A device according to claim 3 in which the winding in each slot is provided with a plurality of turns.

5. A device according to claim 4 in which said coating is constituted by a plated layer of copper.

6. The device of claim 1 wherein said interposed slot includes a winding in which the current flow is in the opposite direction.

* * * * *